Jan. 25, 1955 P. M. MILES 2,700,513

TAPE WINDER

Filed Dec. 9, 1949 4 Sheets-Sheet 1

Inventor

PATRICK M. MILES

By Harper Allen

Attorney

Jan. 25, 1955

P. M. MILES

TAPE WINDER 2,700,513

Filed Dec. 9, 1949

4 Sheets-Sheet 2

Inventor
PATRICK M. MILES

By Harper Allen

Attorney

Jan. 25, 1955 P. M. MILES 2,700,513

TAPE WINDER

Filed Dec. 9, 1949 4 Sheets-Sheet 3

Inventor

PATRICK M. MILES

By Harper Allen

Attorney

Jan. 25, 1955 P. M. MILES 2,700,513

TAPE WINDER

Filed Dec. 9, 1949 4 Sheets-Sheet 4

Inventor

PATRICK M. MILES

By Harper Allen

Attorney 2,700,513

TAPE WINDER

Patrick M. Miles, San Francisco, Calif.

Application December 9, 1949, Serial No. 132,173

4 Claims. (Cl. 242—75)

The present invention relates to machines for handling tape, for example, for winding tape into a foldable roll as it is received from a tape printing machine such as a bank proof machine or a stock ticker and for automatically responding to the tension of the tape in effecting the winding operation so that the sequence of operations is entirely automatic insofar as winding is concerned.

As brought out above, the machine has for its general object the handling or winding of tape as it issues from a machine operated in a step-by-step fashion so that the tape is automatically placed in a convenient form for subsequent handling and storage. The machine is adapted to respond automatically to the step-by-step feeding of the tape from the machine in which the tape is being printed and is adapted to be free-wheeled in unwinding tape for inspection and to subsequently automatically take up the tape again into a tight roll. The machine is also constructed to provide ease in inspection of the tape while additional tape is being fed from the tape printing machine without stopping the operation involved.

The above and other objects of the invention are attained in a preferred embodiment of the invention as illustrated in the accompanying drawings in which.

Figure 1:
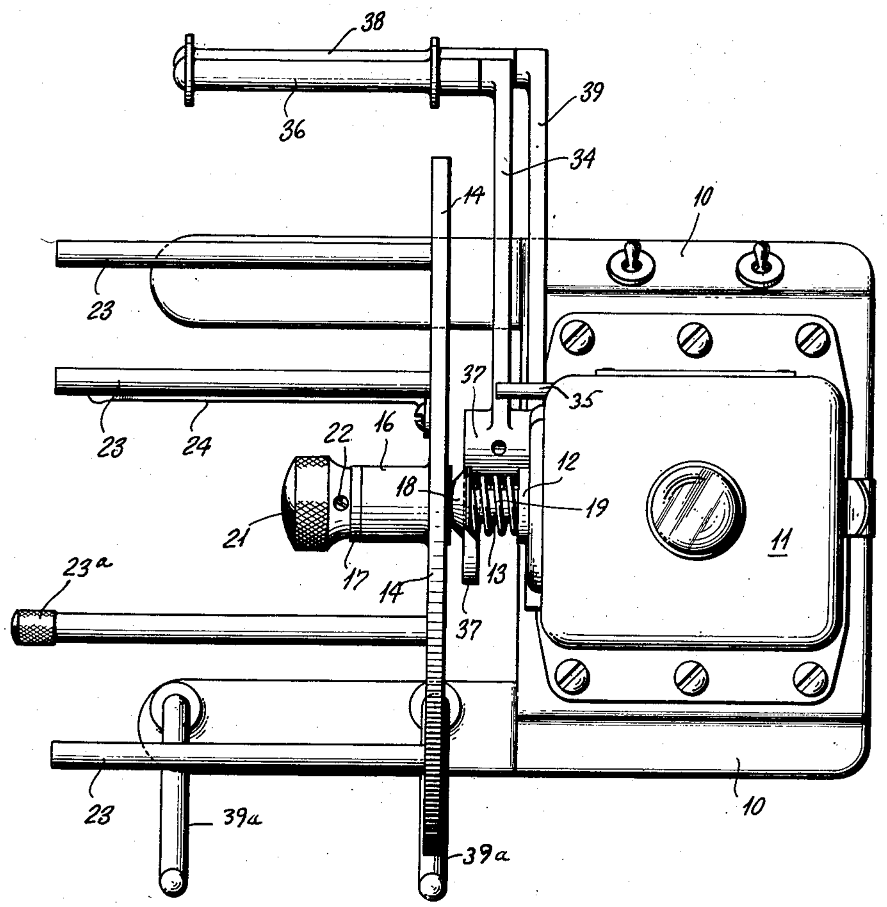
Figure 1 is a plan view of the tape winding machine.

Referring to the drawings the machine includes a base 10 on which a housing 11 is suitably secured. The housing 11 carries a casting 12 providing a bearing for a main drive shaft 13 on which the reel 14 is journalled. The hub 16 of the reel is disposed between a friction washer 17 and a combined friction washer and cam element 18 disposed on the shaft 13 to rotate therewith. A spring 19 interposed between the cam element 18 and the casting 12 serves to provide a friction drive from the parts 17 and 18 to the reel 14. An adjusting nut 21 threaded on the end of the shaft and secured thereon by set screw 22 controls the tension of the spring 19. The reel 14 carries a series of circumferentially spaced supporting pins 23 one of which 23*a* is threaded into the reel 14 to be removable therefrom so that a roll of tape can be readily removed from the supporting pins 23 and 23*a*. Also a spring clip 24 is secured on the reel 14 in engagement with one of the pins 23 to provide for frictional securing of the end of the tape thereon as seen more clearly in Figure 3.

Figure 3:
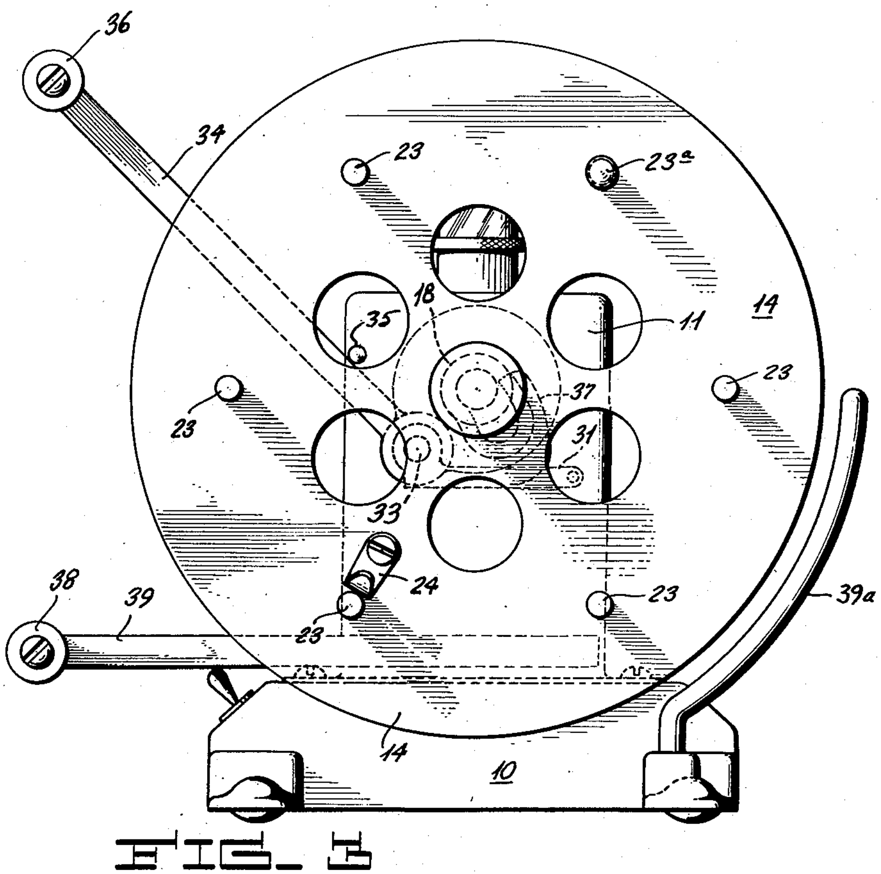
Figure 3 is an elevational view of the machine looking from the left of Figure 2.
Figure 4:
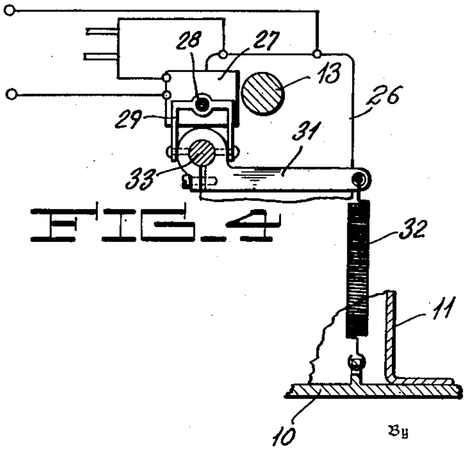
Figure 4 is a fragmentary sectional view illustrating the switch control.
Figure 5:
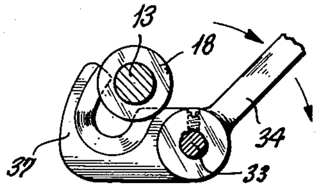
Figure 5 is a fragmentary sectional elevational view illustrating the friction clutch release control.

The drive for the shaft 13 is obtained from an electric motor 26 suitably mounted within the housing 11 and operated under the control of a suitable switch 27 (Figure 4) having a switch element 28 controlled by a bracket 29 secured to a control lever 31 which is urged clockwise by a spring 32. The shaft 33 carrying the lever 31 extends outside of the housing 11 and has secured thereon a control arm 34 carrying a roll 36 over which the tape passes as will be later explained. The arm 34 has associated therewith a stop 35. The arm 34 (Figures 1, 3, and 5) also carries a forked control cam element 37 for cooperation with the cam surface of the cam element 18. The forked end of the element 37 is disposed in spaced relation to the cam element 18 as shown in Figure 3. Upon movement of the arm 34 clockwise, as viewed in Figure 5, the cam surface of the element 37 engages the cam element 18 and effects displacement of element 18 to the right, as viewed in Figure 1, so that the tension of the spring 19 is removed from the reel 14 and the reel is free to be turned in removing tape from the machine.

As seen in Figure 3 a second stationary guide roll 38 is carried by an arm 39, and the tape 40 (Figure 6) is placed over the roll 36, then passes under the roll 38 to the reel pins 23 so that clockwise rotation on the reel will wind the tape thereon. If counter-clockwise rotation winding is desired, the threading of the tape over the rolls 36 and 38 may be reversed.

Figure 2:
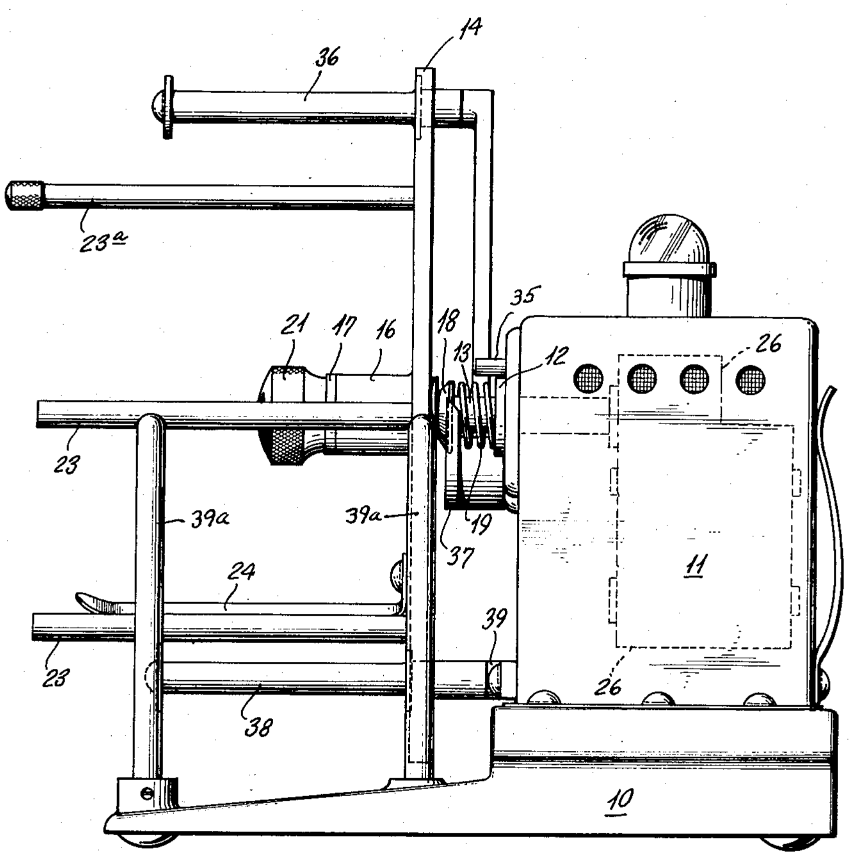
Figure 2 is an elevational view of the machine.

To enable correction of check of items on the tape rolled onto the reel 14, the machine is provided with tape guide means in the form of a pair of upright arcuate guide arms 39*a* (Figures 1, 2, and 3) which are mounted on the base at the opposite side of the reel 14 from the control arm 34, and are spaced apart the width of the tape being used. Without disconnecting the tape feed, a turn of tape can be loosened on the reel, with the arm 34 depressed, and the desired length of tape unwound as a loop. This permits inspection of the tape for errors, and correction of such errors.

Figures 6, 7:
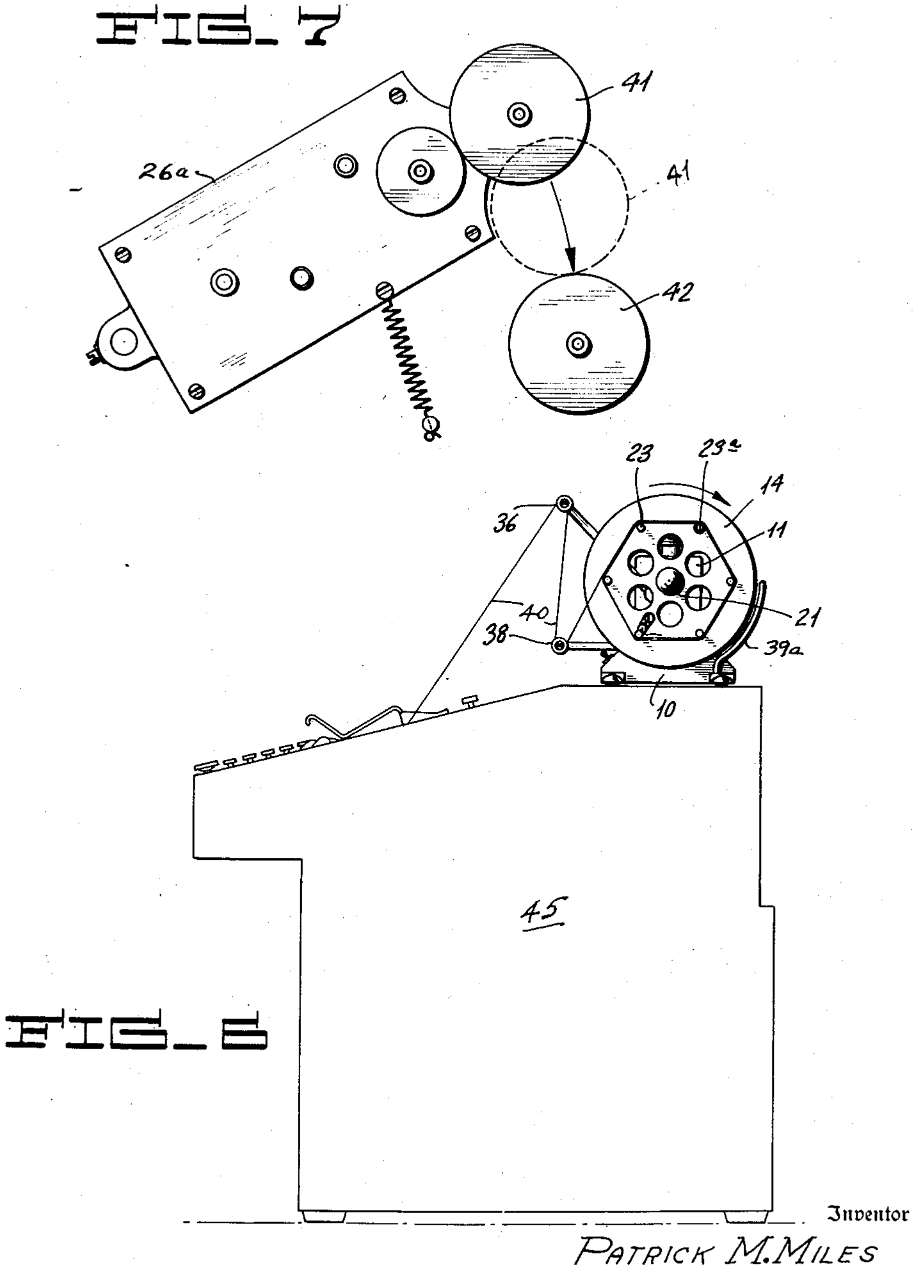
Figure 6 is a schematic view illustrating the machine as used in conjunction with a bank proof machine.
Figure 7 is a fragmentary view illustrating a modified type of drive.

Figure 6 shows the tape winder as used in conjunction with a bank proof machine 45 of the type disclosed in the patent to Brand et al., 2,146,695, issued February 7, 1939, for Control Check Sorting Machine. It will be understood that the tape handling machine disclosed herewith is useful in combination with various types of recording accounting machines such as check sorting machines, adding machines, cash registers, etc., where a tape is fed intermittently from the printing mechanism of the accounting machine under control of suitable operation control keys.

Figure 7 shows a modified form of the invention in which the pivotally mounted motor 26*a* carries a friction drive element 41 for engagement with a second friction element 42 connected to drive the reel 14.

While I have shown a preferred embodiment of the invention it will be understood that the invention is capable of variation and modification from the form shown so that its scope should be limited only by the scope of the claims appended hereto.

I claim:

1. A tape handling machine comprising tape accumulating means, drive means for said accumulating means, including a motor and a clutch, and tape-responsive control means having a movable part interposed between said accumulating means and a source of supply of tape for engagement by the tape in feeding from said source of supply to said accumulating means, said control means having respective controlling connections to said motor and said clutch operable sequentially upon movement of said movable part in response to tensioning of said tape to interrupt the drive of said motor and thereafter to disable said clutch, the disabling of said clutch enabling withdrawal of said tape from said accumulating means for inspection.

2. A tape handling machine comprising a reel for accumulating tape thereon, drive means for said reel including a motor and a clutch, a pivotally mounted control arm having means engaged by the tape in passing from a source of supply to the reel to be responsive to the tension of the tape, means spring-urging said control arm to a drive-establishing position, means controlled by said control arm for interrupting operation of said motor upon initial movement of said control arm away from said position in response to tensioning of the tape, and means controlled by said control arm upon further movement thereof away from said position for disabling said clutch.

3. A tape handling machine comprising a reel having a circular series of projecting pins thereon for accumulating tape, at least one of said pins being removable, driving means for said reel, a pivotal drive control arm at one side of said reel having means engaged by the tape in passing from a source of supply to the reel to be responsive to the tension of the tape, means spring urging said control arm to a drive establishing position, means controlled by said control arm for interrupting operation of said driving means upon movement of said control arm away from said position in response to tensioning of the tape, said driving means including a friction clutch, means urging said clutch to engaged position, and a control element operated by said control arm in a driving disabling position thereof for disabling said friction clutch, whereby the tape can be withdrawn from said reel across said control arm for inspection.

4. The combination with an accounting machine for supplying a record on a tape, of a tape handling machine for receiving the tape from the accounting machine, said tape handling machine having a tape controlled element mounted for movement thereon in response to the tension of the tape between the two machines, said tape handling machine also including a clutch, and means controlled by said tape responsive element to disengage said clutch in response to tension on the tape and thereby permit unwinding of tape from said reel for inspection without interfering with the operation of said accounting machine.

References Cited in the file of this patent

UNITED STATES PATENTS

| | | |
|---|---|---|
| 80,664 | Porter et al. | Aug. 4, 1868 |
| 312,014 | Pottin | Feb. 10, 1885 |
| 1,654,800 | Garbutt | Jan. 3, 1928 |
| 2,058,329 | Littell | Oct. 20, 1936 |
| 2,097,142 | Borton | Oct. 26, 1937 |
| 2,146,695 | Brand et al. | Feb. 7, 1939 |